Shoemaker & Phelps.
Frame for Hop-Vine.
Nº 75474.    Patented Mar. 10, 1868
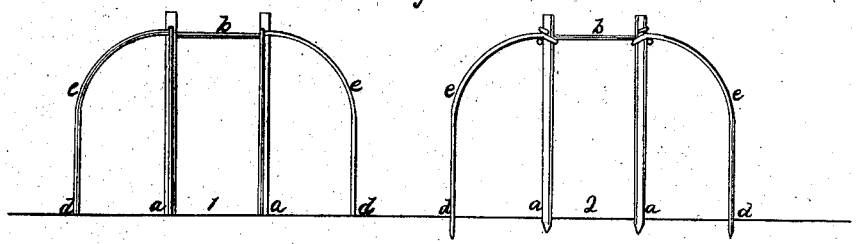
Fig. 1.
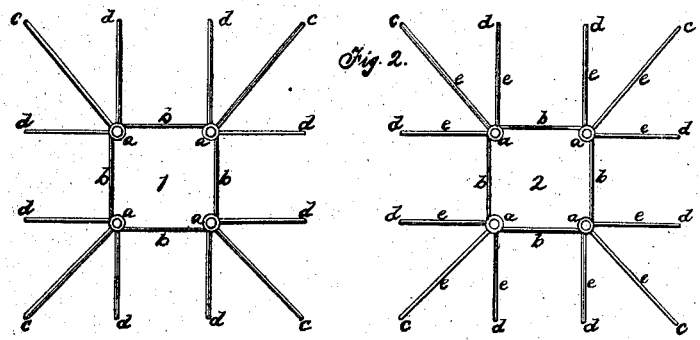
Fig. 2.
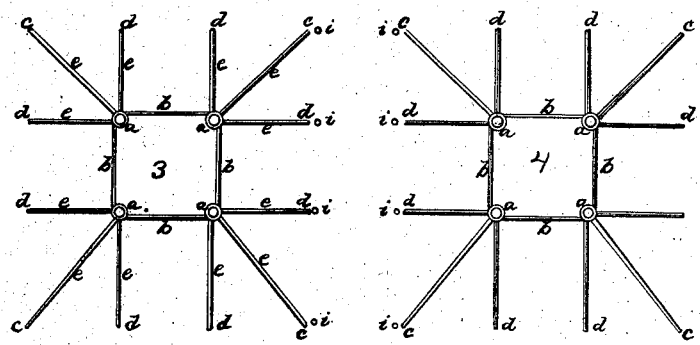
Witnesses.
H. C. Ashkettle.
Wm. A. Morgan.
Inventor.
A. Shoemaker
H. Phelps
per Munn & Co.
Attorneys.

United States Patent Office.

ABRAM SHOEMAKER AND WALLACE PHELPS, OF CONESVILLE, NEW YORK.

Letters Patent No. 75,474, dated March 10, 1868.

IMPROVEMENT IN FRAME FOR HOP-VINES.

The Schedule referred to in these Letters Patent and making part of the same.

TO ALL WHOM IT MAY CONCERN:

Be it known that we, ABRAM SHOEMAKER and WALLACE PHELPS, of Conesville, in the county of Schoharie, and State of New York, have invented a new and useful Improvement in Frame for Hop-Vines, &c.; and we do hereby declare that the following is a full, clear, and exact description thereof, which will enable those skilled in the art to make and use the same, reference being had to the accompanying drawings, forming part of this specification, in which—

Figure 1 is a side view of our improved hop-vine frame.

Figure 2 is a top view of a group of the frames, showing their position and relation to each other.

Similar letters of reference indicate corresponding parts.

This invention relates to a new and useful improvement in the construction and arrangement of frames for training hop-vines and other running plants, the object of which is to obtain the cheapest structure that will afford an extensive support for the vines, so that they shall have full exposure to the sun, and a free circulation of air among them.

The general arrangement of our improved frames is in squares placed in lines or rows parallel to each other, with wide alleys between, in which corn or other straight and smaller plants may be cultivated, as shown by the four squares, 1, 2, 3, 4, fig. 2. This growth in the squares is simply for the purpose of keeping lice or other insects from deteriorating the hops, an expedient proven by repeated trial to be effective.

Each frame is formed with four strong vertical stakes, $a\ a$, for the main support of the structure, set in the ground at the corners of an interior square, and secured at the top by four horizontal cross-ties or braces, $b\ b$, making the sides of the central square. At the corners $c\ c$ of an interior square, and at two intermediate points, $d\ d$, on each side thereof, in line with the sides $b\ b$ of the interior square, are set in the ground pliant hoop-poles or rods, $e\ e$, bent over at their upper ends, which are fastened to the top of the main stakes $a\ a$, as shown clearly in fig. 1.

The hop or other running plant is set at the foot of each of the poles $e\ e$, to climb upon it, and thus sixteen plants, including those of the four centre-poles, will grow upon each frame, uniting at the central square, and forming an arbor or bower fully exposed to the sun and rain in every part, and open enough for a free circulation of the air among the vines. The distances apart of the poles will vary in different localities, according to the soil and nature of the plant. The width of the alleys between the frames will also be governed according to circumstances, and a wide space may be left for the cultivation of other plants and vegetables, as indicated by the letters $i\ i$, which will not shade the hop or other vines growing on the frame.

Having described our invention, we claim as new, and desire to secure by Letters Patent—

An improved hop-vine frame formed in squares of four stakes, $a\ a$, joined together at top by the cross-ties $b\ b$, in combination with the bent poles $c\ c$, arranged as and for the purposes herein described.

ABRAM SHOEMAKER,
WALLACE PHELPS.

Witnesses:
A. G. CASE,
WM. E. RICHTMEYER.